Figure 1:
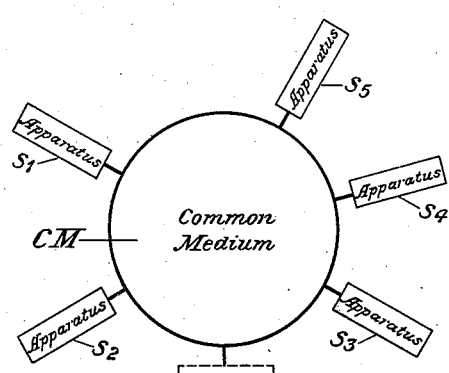

Dec. 22, 1936.  E. I. GREEN  2,064,907

COMMON MEDIUM MULTICHANNEL EXCHANGE SYSTEM

Filed May 26, 1934  4 Sheets-Sheet 1

INVENTOR
E. I. Green
BY
ATTORNEY

Dec. 22, 1936.　　　　E. I. GREEN　　　　2,064,907
COMMON MEDIUM MULTICHANNEL EXCHANGE SYSTEM
Filed May 26, 1934　　　4 Sheets-Sheet 2

INVENTOR
E. I. Green
BY
ATTORNEY

Dec. 22, 1936.  E. I. GREEN  2,064,907
COMMON MEDIUM MULTICHANNEL EXCHANGE SYSTEM
Filed May 26, 1934      4 Sheets—Sheet 3

INVENTOR
E. I. Green
BY
ATTORNEY

Dec. 22, 1936.                E. I. GREEN                2,064,907
COMMON MEDIUM MULTICHANNEL EXCHANGE SYSTEM
Filed May 26, 1934                4 Sheets-Sheet 4
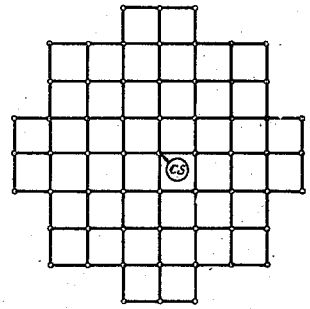
*Fig. 16*
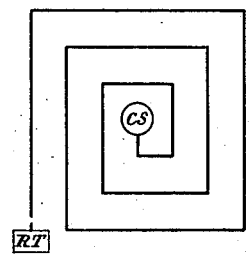
*Fig. 17*
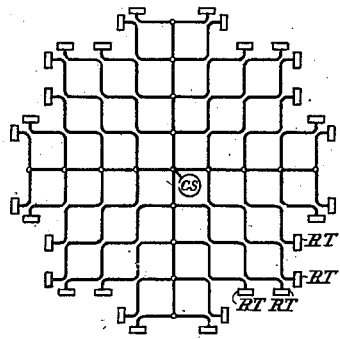
*Fig. 18*
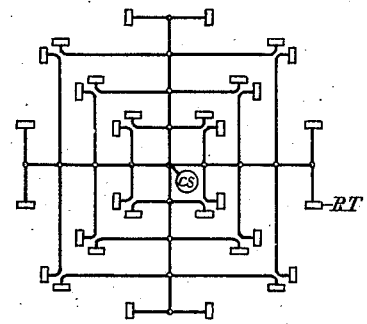
*Fig. 19*
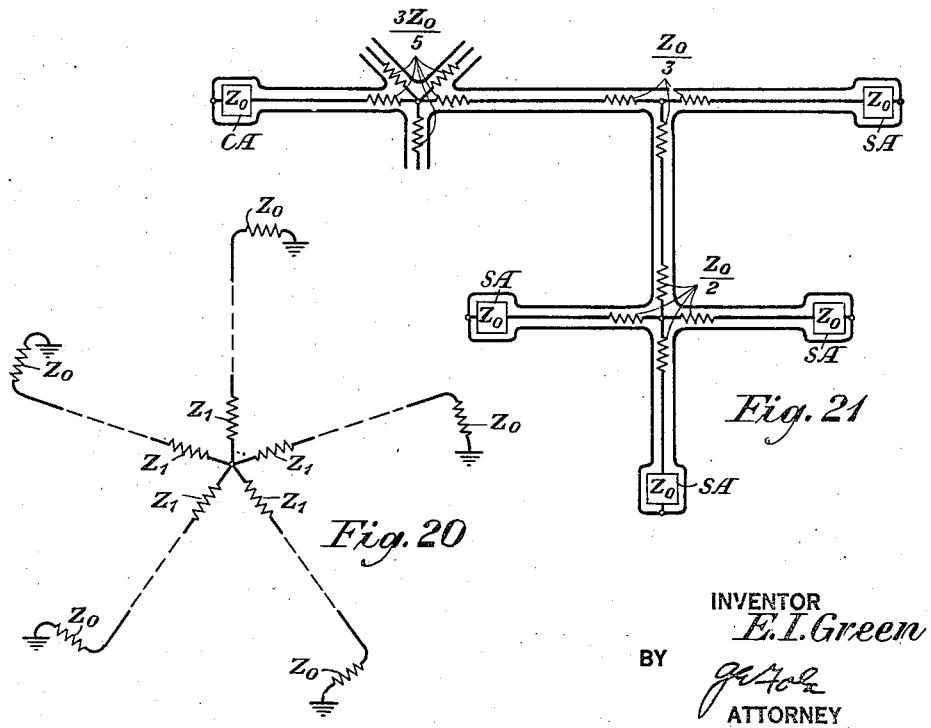
*Fig. 20*
*Fig. 21*
INVENTOR
*E. I. Green*
BY
ATTORNEY Patented Dec. 22, 1936

2,064,907

UNITED STATES PATENT OFFICE 2,064,907

COMMON MEDIUM MULTICHANNEL EXCHANGE SYSTEM

Estill I. Green, East Orange, N. J., assignor to American Telephone and Telegraph Company, a corporation of New York Application May 26, 1934, Serial No. 727,806

19 Claims. (Cl. 179—15)

This invention has for its object the provision of an exchange system in which communication between subscribers is carried out over channels of different frequency derived from a common transmission medium. More particularly, the invention is designed to utilize as a substitute for the many subscriber pairs which are employed in the ordinary telephone exchange system the many channels which are obtainable in the high-frequency art as it is now unfolding and to provide means whereby these channels may be selected by subscribers at will and employed for interconnection.

In the telephone exchange systems which have heretofore been provided it has been the practice to group subscribers in central office areas. Each subscriber is connected to his own central office by means of an individual wire circuit or by a party line arranged for non-simultaneous use by a few subscribers. When a subscriber desires to call another subscriber he utilizes his own line to the central office, and upon passing the desired number either to an operator or to an automatic switching mechanism is connected to another line which extends either directly or via another office or offices to the called party. For a system of this kind many thousands of subscriber circuits are necessary in each central office area. These are commonly provided in the form of a network of multiple pair cables extending over the area.

In accordance with the present invention it is proposed to substitute for such individual wire circuits extending to each subscriber a transmission medium which is common to all subscribers and which will accommodate a range of frequencies sufficiently wide for a large number of telephone channels. Interconnection between subscribers is then carried out over these high-frequency channels.

The essence of the invention resides in making available to a large number of subscribers a transmission medium capable of accommodating a wide range of frequencies so that the subscribers may utilize, for the purposes of intercommunication, a plurality of signaling channels derived from the wide-band medium. The provision of a transmission medium capable of handling the large number of channels required for an exchange system is, therefore, one of the principal objects of the invention.

This type of system is not known to have been heretofore invented, apparently because the necessary wide-frequency spectrum which is required has not been available to the art either by radio or wire methods. A conception of the band width which is required may be had by assuming that there is taken as a unit a local exchange system of 1000 subscribers and that each subscriber is allotted an individual channel of 10,000 cycles, making a total band width of some 10,000,000 cycles. Any such band width as this has not been available in the art until very recently.

In the case of radio, until the recent opening up of the ultra-high-frequency (ultra-short-wave) range, the art has not permitted the invention to be realized, for three reasons: First, there was not sufficient space in the frequency range, which until recently did not go beyond about 30 mc., to accommodate this type of service along with all the other demands upon the radio spectrum; second, the characteristics of the waves vary widely through this spectrum (up to 30 megacycles), so that it is difficult to obtain a wide band having sufficiently uniform characteristics for the purpose; third, the waves in this range do not cut off very sharply with distance, and as a result their interfering effects extend to great distances, in many cases thousands of miles, making it impossible to operate a local service in one area without giving rise to interference in distance areas. With the opening of the ultra-high-frequency range, frequencies above 30 mc. (wavelengths below about 10 meters), an entirely new prospect is presented, making it for the first time physically possible to set up by radio the system comprising the invention. Of course, this is not saying that the system will either prove to be desirable or economical for actual operation. This will not be known until a great deal of development work is done and the general art is much further advanced.

It will be appreciated also that the invention has not been feasible heretofore as a wire proposition because it has not been possible until very recently to transmit over wire circuits for considerable distances frequency bands greater than some tens of thousands or, at most, hundreds of thousands of cycles. The transmission of bands of some millions of cycles as required by the invention has become possible by wire methods only recently through the development of radically new types of wire systems, as exemplified by the coaxial conductor type of line, as described in U. S. Patent No. 1,835,031, to L. Espenschied and H. A. Affel, and in a technical paper which is now being prepared and which it is expected will be published during 1934. These new wire systems are characterized by the provision of means for quite completely shielding the transmission path from outside disturbances. This is done in the coaxial circuit by the outer conductor which serves both as a shield and one of the line conductors. By virtue of the skin effect at these very high frequencies, the desired transmission is confined to the inner surface of the tube and interference originating from without is confined to the outer surface. Thus, the shielded type of circuit permits of blocking off a wide frequency band for the purposes of the invention and subjecting the transmitting medium to full control in respect to the exclusion of interference, the prevention of overhearing on the part of outsiders, and the general knitting together of the system as a self-contained unit. In other words, in this wire embodiment of the invention there are retained the advantages of wire transmission, plus the advantage of radio in respect to the availability of a wide frequency spectrum.

In general, these recent developments, whereby the frequency range of radio and of wire transmission is being greatly extended, are the basis of the present invention. The extension of the frequency range is so great as to amount to the imparting to the art of a new dimension of development, the frequency dimension, whereby it becomes possible to derive large numbers of telephone channels and to handle them as a group. Thus, there is obtained on a frequency basis large numbers of identical channels comparable to the large number of physical circuits which are obtained in the local telephone plant in the familiar telephone cables.

While the use of radio as a common medium is contemplated within the scope of the invention, this disclosure will be more particularly concerned with the provision of conducting or guiding media suitable for the transmission of a wide band of frequencies.

One form of such a transmission medium might be provided by a network extending to all the subscribers within a given area. Conceivably, such a network might be composed of ordinary wire circuits branched and interconnected so as to make the common circuit available to each subscriber. Thus, the wire network might be somewhat similar to the network employed for distributing light and power currents, except that a simple two-wire network without multi-phase connections, voltage transformation arrangements, etc., would suffice. It would, however, be possible to carry out the invention by employing the light and power network itself and this is contemplated within the scope of the invention.

The preferred form of guiding transmission medium, however, is one which is designed for the transmission of a wide band of frequencies with comparatively low attenuation and preferably also with shielding to minimize the effect of external disturbances. Such a transmission medium may be found in a circuit consisting of two conductors disposed coaxially with respect to one another. In a properly designed coaxial circuit, as will be hereinafter explained, low attenuation at high frequencies may be attained by the employment of conductors of suitably low high-frequency resistance and the use of a substantially gaseous dielectric between the conductors. With this type of circuit the outer conductor serves also as a shield whose protective effect becomes more nearly perfect as the frequency is increased, so that at high frequencies practically complete immunity from external disturbances may be obtained.

The invention contemplates also as an alternative to the coaxial circuit a high-frequency transmission medium comprising a circuit consisting of two conductors surrounded by a shield. Here, again, the high-frequency attenuation may be minimized by proper design with substantially gaseous insulation and the thickness of shield may be determined so as to minimize interference from external disturbances.

Yet another form of transmission medium suitable for carrying out the invention is a dielectric wave guide comprising a cylindriform dielectric material which may or may not be surrounded by a conductor. An advantageous form of such a transmission path is a hollow cylindrical conductor containing air or some other gas as the dielectric. This type of circuit is particularly adapted to transmit waves of very high frequencies, for example, of the order of a few centimeters or less in wavelength.

It is contemplated that the subscribers may be interconnected over the available channels either (1) at a central office or (2) directly. Connection at the central office may be effected in much the same way as is now done by deriving out the channels into physical circuits which may be switched to one another.

Direct connection between subscribers is effected by a process of tuning or selection. This method takes advantage of the fact that the transmission medium is common to all of the subscribers, with all of the channels accessible to each subscriber at will. The switching function is placed in the hands of the individual subscribers by eliminating the central office in so far as connections within the given area are concerned. Connection to subscribers in other areas is carried out through the respective central offices which are joined by trunk channels or circuits suitable for the purpose.

In general, the invention contemplates the assignment to each subscriber of a particular frequency or frequencies which might preferably be related to his telephone number. The assignment of frequencies should be such as to facilitate the interconnection of subscribers and various schemes of frequency allocation are provided in the invention for this purpose. One feature of the invention is the supplying from a central point of the carrier frequencies required at the subscribers' stations.

Figure 3:
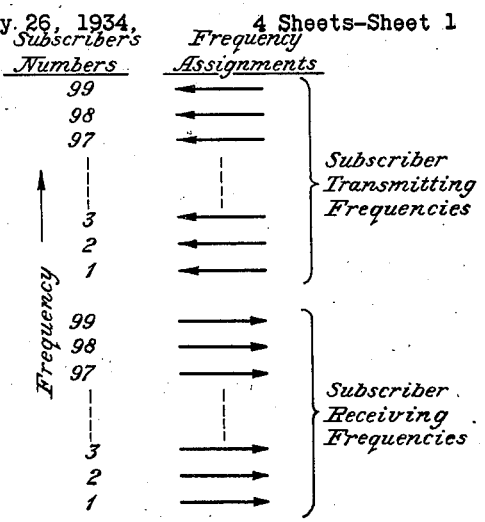
Figure 2:
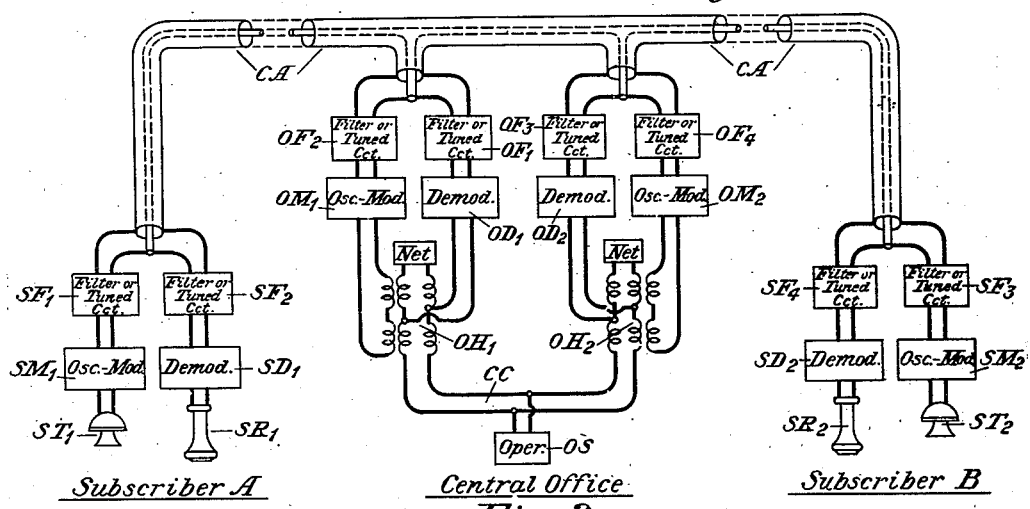
Figure 4:
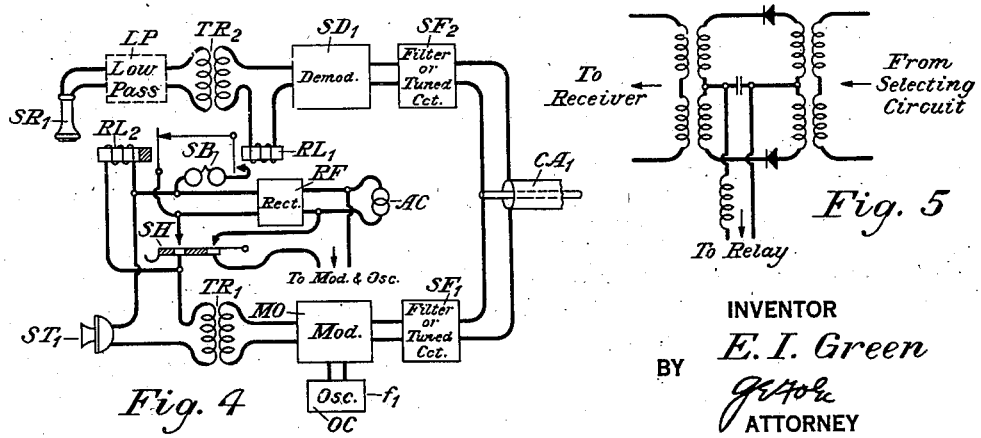
Figure 5:
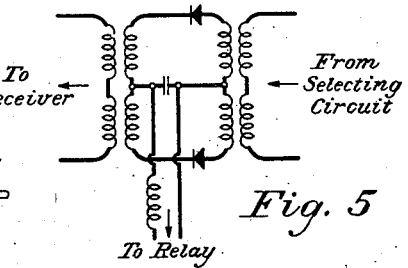
Figure 6:
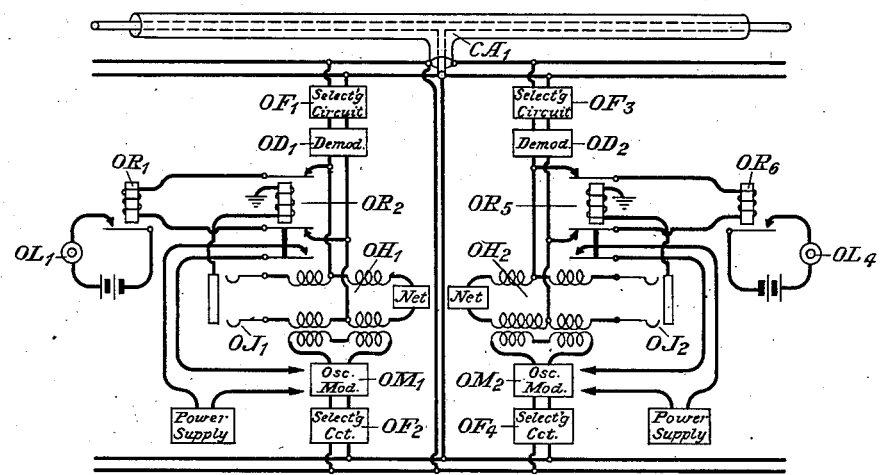
Figure 7:
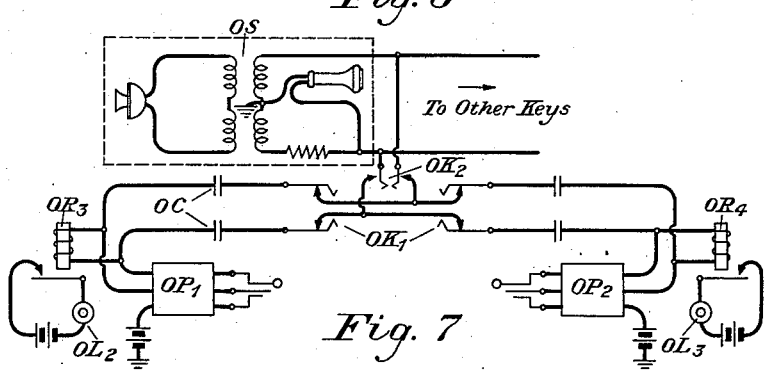
Figure 8:
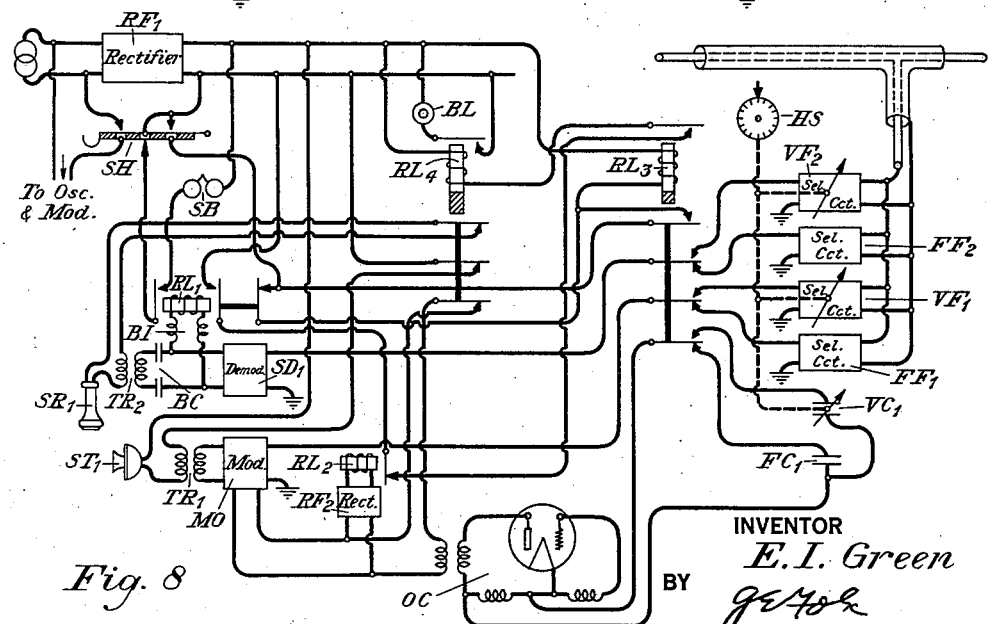
Figure 9:
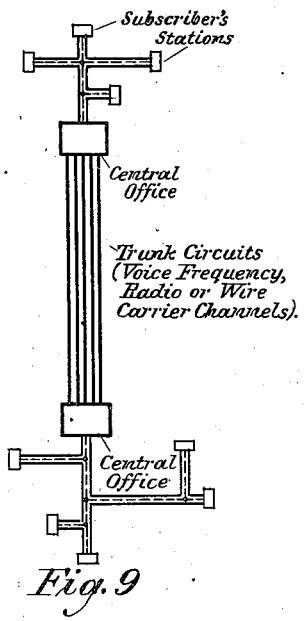
Figure 11:
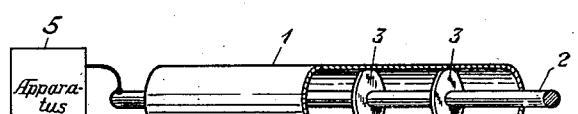
Figure 12:
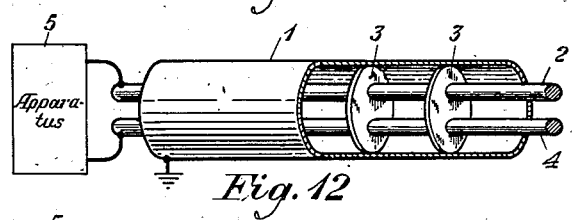
Figure 13:
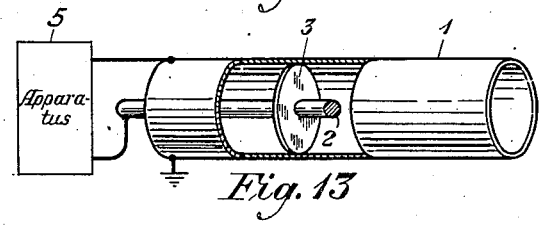
Figure 10:
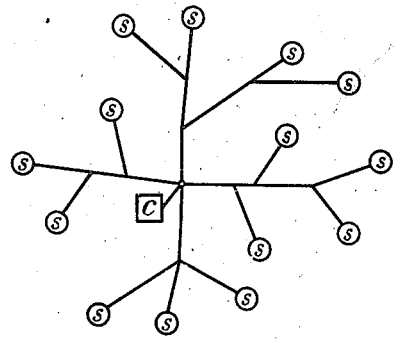
Figure 15:
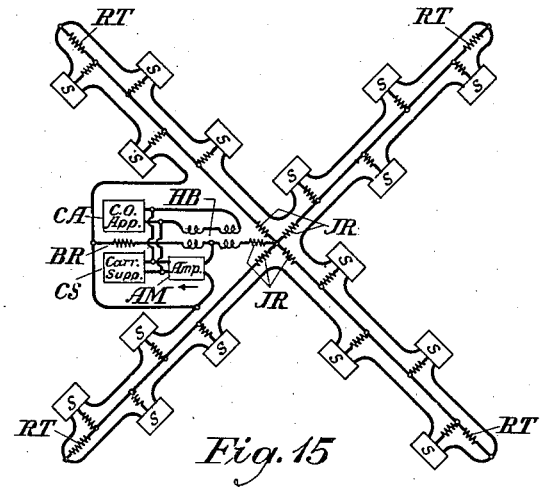
Figure 14:
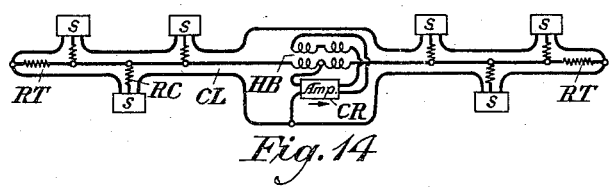

The foregoing outline having indicated some of the principles of the invention as well as a few of its major objects, the complete invention with its various details, features and purposes will now be understood from the following description when read in connection with the accompanying drawings, in which Figure 1 shows a schematic representation of the principal idea of the invention wherein a large number of stations are connected to a common transmission medium; Fig. 2 shows in schematic form a system for connecting subscribers through a central office over a network of coaxial conductors; Fig. 3 shows one possible allocation of frequencies for a multi-channel exchange system; Fig. 4 shows a subscriber station arrangement which may be used in the system of Fig. 2; Fig. 5 shows a modulating device which may be used in various applications of the invention; Figs. 6 and 7 in combination show a central office arrangement which may be used in association with the subscriber station arrangement of Fig. 4; Fig. 8 shows an arrangement of subscribers' apparatus for direct interconnection without the assistance of a central station; Fig. 9 is a schematic diagram indicating how connections may be established directly between subscribers in the same area, while connections between subscribers in different areas are completed through central offices over trunk circuits; Fig. 10 is a schematic diagram of a guiding or conducting network which is available in common to a central station and a number of subscribers; Figs. 11, 12 and 13 show different forms of transmission paths which may be used to form a transmission medium common to a number of subscribers; Fig. 14 shows an arrangement for providing central amplification in a network extending to a number of subscribers; Fig. 15 shows a modification of Fig. 14 in which a number of subscriber stations may communicate with one another or with a central station over a common transmission network, the central station providing amplification as well as a common source of carrier frequencies; Fig. 16 shows one scheme for making a common transmission network available to a number of subscribers; Figs. 17, 18 and 19 show network arrangements alternative to that of Fig. 16; Fig. 20 shows a method of avoiding reflections at a junction of a number of branching circuits; and Fig. 21 shows an alternative method of connecting subscriber stations to a common transmission network.

Referring to Fig. 1, there is illustrated one of the principal aspects of the invention. In this figure is shown a common medium CM, to which are connected a plurality of stations $S_1$, $S_2$, $S_3$, etc., each of which includes transmitting, receiving and associated apparatus. This apparatus, which will be hereinafter described, is arranged to permit intercommunication between different pairs of stations over the common medium CM employing different frequency bands to permit simultaneous communication between different pairs of stations. Connection between any pair of stations may take place directly between the two stations as, for example, $S_1$ and $S_3$ or it may take place through the common central station CS which is shown in dotted lines in the figure.

Fig. 2 shows in schematic form a telephone exchange system in which a number of subscribers may be interconnected through a central office, the connection between each subscriber and the central office being accomplished over a network composed of coaxial conductors. Each subscriber is provided with transmitting apparatus including an oscillator-modulator and receiving apparatus including a demodulator, together with the necessary selecting circuits. At the central office a plurality of circuits such as the one shown is provided for interconnecting between subscribers. Each connecting circuit includes two separate sets of apparatus, each of which comprises a transmitter and receiver, and a connection, to which the operator has access, between the two sets of apparatus.

Transmission from subscriber A to subscriber B is effected by means of the transmitter $ST_1$, the oscillator-modulator $SM_1$, the tuned circuit or filter $SF_1$, the coaxial conductor CA, the tuned circuit or filter $OF_1$, the demodulator $OD_1$, the hybrid coil $OH_1$, the connecting circuit CC (across which is bridged the operator's set OS), the hybrid coil $OH_2$, the oscillator-modulator $OM_2$, the tuned circuit or filter $OF_4$, the coaxial circuit CA, the tuned circuit or filter $SF_4$, the demodulator $SD_2$ and the receiver $SR_2$. Transmission in the opposite direction is accomplished in an analogous manner, employing the transmitter $ST_2$, the oscillator-modulator $SM_2$, the selecting circuit $SF_3$, the coaxial circuit CA, the selecting circuit $OF_3$, the demodulator $OD_2$, the hybrid coil $OH_2$, the connecting circuit CC, the hybrid coil $OH_1$, the oscillator-modulator $OM_1$, the selecting circuit $OF_2$, the coaxial circuit CA, the selecting circuit $SF_2$, the demodulator $SD_1$ and the receiver $SR_1$.

It is proposed that different frequencies be employed for the oppositely directed transmissions in Fig. 2 and that the frequencies employed between the calling subscriber and the central office be different from those used between the central office and the called subscriber. Transmission might be on either a double or a single sideband basis with the carrier frequency transmitted.

In order that simultaneous conversations may take place between a number of pairs of subscribers, it is necessary that the frequencies employed in the system of Fig. 2 be properly selected. One way of arranging the frequencies would be to assign to each subscriber a separate pair of frequencies, one for transmitting and one for receiving, and to provide apparatus at the central office for receiving and transmitting the various required frequencies. Thus, subscriber A might be assigned a transmitting frequency $f_1$ and a receiving frequency $f_2$, and subscriber B transmitting and receiving frequencies $f_3$ and $f_4$, respectively. This would mean that in Fig. 2 the modulators $SM_1$ and $SM_2$ would operate with carrier frequencies $f_1$ and $f_3$, respectively, and the modulators $OM_1$ and $OM_2$ with carrier frequencies $f_2$ and $f_4$, respectively.

With such a scheme it might prove desirable, in order to facilitate the allocation of frequencies and the interconnecting of subscribers, to have a constant difference between the transmitting and receiving frequencies of each subscriber or, in other words, to make $$f_1-f_2=f_3-f_4=D \qquad (1)$$

The frequencies $f_1$, $f_3$, etc., might then be grouped in one part of the frequency spectrum and the frequencies $f_2$, $f_4$, etc., in another part. A diagram of a frequency allocation of this sort, assuming a total of 99 subscribers, is given in Fig. 3. It will be noted that the order of the frequency assignments corresponds to that of the subscriber numbers. This scheme, while not essential to all embodiments of the invention, is a very desirable feature in many.

Detailed arrangements of apparatus which might be used at the subscriber's station and at the central office in a scheme of this sort are illustrated in Figs. 4, 6 and 7. While some of the apparatus shown in these and succeeding figures is more particularly adapted to frequencies lying below the ultra-short wave range, it will be understood that such apparatus is shown merely to illustrate the principles of the invention, and is not intended in any way to limit its scope.

The operation of the subscriber's apparatus illustrated in Fig. 4 is as follows: When the subscriber desires to make a call, the receiver $SR_1$ is removed from the switchhook SH. Through the contacts of the switchhook this closes a circuit which furnishes power supply to operate the oscillator and modulator OC and MO. The operation of the switch hook also provides D. C. supply for the transmitter $ST_1$, this supply being derived through a rectifier RF which is connected to the A. C. supply. The speech currents produced in the transmitter, after passing through the transformer $TR_1$, are modulated upon the assigned frequency, here assumed to be $f_1$. The oscillator and modulator may be separate units of any desired types, or a self-oscillating modulator might be used. The carrier and sidebands in the modulator output, after passing through the selecting circuit $SF_1$, are conducted by the coaxial conductor $CA_1$ to the central office. When communication with the central office is established in a manner hereinafter to be described, the number of the called subscriber is passed orally to the operator and after the proper arrangement are set up at the central office, communication is established with the called subscriber who is provided with apparatus identical with that of Fig. 4 except for the frequency assignments used.

In the case of an incoming call, the carrier frequency $f_2$ and its associated sidebands are received over the coaxial circuit $CA_1$, selected by the selecting circuit $SF_2$ and demodulated by the demodulator $SD_1$. This demodulator may be of the vacuum tube type, in which case it should be kept always in operating condition so that a call may be received. Preferably, however, the demodulator might comprise some passive element or elements, as, for example, copper-oxide units as shown in Fig. 5. Associated with the demodulator is a relay $RL_1$ which is operated by the rectified current resulting from the incoming carrier frequency and which in turn operates the call bell $SB$. When the subscriber answers the call, the switchhook $SH$ is operated, which, in addition to completing the contacts previously mentioned, operates the slow-release relay $RL_2$ which breaks the circuit of the bell $SB$. The received voice-frequency currents, after passing through the transformer $TR_2$, are applied to the receiver $SR_1$ and two-way communication is thus established. If desired, a low-pass filter $LP$ (shown dotted in Fig. 4) may be included in the receiver circuit to suppress unwanted high-frequency components in the demodulator output. It will be understood that a similar filter may be provided in the arrangements hereinafter described. When the subscriber hangs up, the slow-release feature of $RL_2$ prevents his bell from ringing before the other party also hangs up.

Figs. 6 and 7 illustrate central office apparatus which may be used in conjunction with the subscriber's apparatus shown in Fig. 4. In the arrangement of Fig. 6 a number of selecting circuits $OF_1$, $OF_3$, etc., corresponding to the transmitted frequencies of the different subscribers are connected to a common coaxial conductor $CA_1$. The total number of such selecting circuits is equal to the total number of subscribers to be served in the area. Similarly, selecting circuits $OF_2$, $OF_4$, etc., which correspond to the receiving frequencies assigned to the various subscribers are connected to the same coaxial conductor $CA_1$. If desired, the transmitting and receiving apparatus might be grouped in other ways for connection to the coaxial conductor network.

The operation of the apparatus in Figs. 6 and 7 is as follows: The incoming carrier frequency of a calling subscriber is received over the coaxial circuit $CA_1$, selected by one of the selecting circuits, for example $OF_1$, and demodulated by the demodulator $OD_1$. Associated with the demodulator is a relay $OR_1$ whose winding is connected to the demodulator output through the contacts of another relay $OR_2$. The rectified current resulting from the incoming carrier frequency operates the line relay $OR_1$, which in turn lights the line lamp $OL_1$, thereby calling the attention of the operator to the incoming call.

The operator is provided with a number of cord circuits of the type shown in Fig. 7, each cord circuit terminating in plugs, such as $OP_1$ and $OP_2$. Upon observing the line lamp she inserts the plug $OP_1$ associated with one of the cord circuits into the jack $OJ_1$ of the calling subscriber. Thus the voice-frequency currents delivered by the demodulator, after passing through the hybrid coil $OH_1$, reach the operator's set $OS$. The sleeve connection of the plug operates the relay $OR_2$ which extinguishes the line lamp $OL_1$, and connects power supply to the oscillator-modulator $OM_1$. The insertion of the plug operates the supervisory relay $OR_3$, which lights the supervisory lamp $OL_2$. This lamp remains lit as long as the calling subscriber has his receiver off the hook. The condensers $OC$ in the cord circuit serve to interrupt the D. C. path, so that line and supervisory relays and lamps may be similarly operated at the other side of the connection.

To the conjugate terminals of the hybrid coil $OH_1$ there are connected the oscillator-modulator $OM_1$ and the selecting circuit $OF_2$ so that the operator may answer the incoming call. The subscriber then passes the number of the called party to the operator. A "busy test" of the called subscriber's line is obtained through the tip of the plug at the other end of the cord circuit and the sleeve of the subscriber's jack. In case another cord circuit is already connected to a jack corresponding to the number of the called party, the sleeve of the jack will have battery connected to it and a click will be produced in the operator's receiver.

If the called subscriber's "line" is not busy, the operator places the plug $OP_2$ in a jack such as $OJ_2$ of Fig. 6 of the called party, thereby completing the connection. The operation of the relay $OR_5$ connects power supply to the oscillator-modulator $OM_2$, so that the carrier is transmitted and the bell of the called party rings. When the called party answers, the supervisory lamp $OL_3$ is lighted by means of relay $OR_4$ and remains lighted until the called party hangs up. The conversation then proceeds with the apparatus functioning in a manner similar to that described in connection with Fig. 2. When the conversation is completed, the lamps $OL_2$ and $OL_3$ are extinguished as the subscribers hang up, and the operator takes down the connection. By means of keys, such as $OK_2$, the operator may connect her set to different cord circuits, and using the key $OK_1$ she may split the connection and talk to either subscriber without the other.

The arrangements thus far described have been designed for the interconnection of subscribers through a central office. There will now be described arrangements whereby subscribers may be connected with one another by a direct path, without the assistance of a central connecting station.

One possible arrangement of this kind is illustrated in Fig. 8, the apparatus for one subscriber's station being shown diagrammatically in this figure. It is assumed in this case that one pair of frequencies is assigned to each subscriber for incoming calls and that in placing a call, a subscriber adjusts the frequencies of his station apparatus to the frequencies assigned to the called party.

The operation of the arrangement shown in Fig. 8 is as follows: In making an outgoing call the subscriber first adjusts the hand switch $HS$ to the number of the called party. This switch may be of various types and may comprise several switches rather than a single one. The adjustment of HS mechanically adjusts the midband frequencies of the variable selecting circuits $VF_1$ and $VF_2$ to the receiving and transmitting frequencies, respectively, of the called party, and also adjusts the variable condenser $VC_1$ to a value such that the frequency of the oscillator OC corresponds to the receiving frequency of the called party.

Having set up the number of the called party, the subscriber removes the receiver $SR_1$ from the switchhook SH. The operation of the switchhook provides power supply for the oscillator and modulator OC and MO. In addition, the operation of the switchhook energizes the slow-release relay $RL_3$ whose winding is connected to the D. C. supply through a back contact of the relay $RL_1$ and a make contact of the switchhook. (At the time the switchhook is removed the relay $RL_1$ in the demodulator circuit is deenergized since the demodulator is connected to the fixed selecting circuit $FF_2$, which is used for incoming calls.) The relay $RL_3$ in pulling up establishes for itself a new circuit leading direct through one of its make contacts to the switchhook contact and thence to the D. C. supply. The relay $RL_3$ then remains operated until the calling subscriber hangs up at the end of the conversation.

The operation of $RL_3$ connects the modulator MO to the variable selecting circuit $VF_1$, the demodulator SD to the variable selecting circuit $VF_2$, and the oscillator tuned circuit to the variable condenser $VC_1$. If at this time the transmitting frequency of the called party is busy, this frequency will be passed by the selecting circuit $VF_2$ and rectified in the demodulator $SD_1$, so that the relay $RL_1$ will be operated. This in turn will energize the relay $RL_4$, which is connected through a make contact of $RL_3$, a back contact of $RL_2$ (which may be a slow-operating relay or may be delayed in operating due to the time required for the oscillator to become operative) and the make contact of $RL_1$ to the D. C. supply. The operation of $RL_4$ will serve to light the busy lamp BL, thereby indicating to the subscriber that the number of the called party is busy.

If the called party's number is not busy, the relays $RL_1$ and $RL_4$ will not become operated and the carrier supply from the oscillator OC will be connected to the modulator MO and the rectifier $RF_2$ through a back contact of $RL_4$. The current from the rectifier $RF_2$ will operate the relay $RL_2$, thereby opening the circuit of $RL_4$. The transmitter $ST_1$ will be connected to the D. C. supply through a back contact of $RL_4$ and the circuit of the receiver $SR_1$ will be completed through another back contact of $RL_4$.

The receiving frequency of the called party, which is sent out by the oscillator OC, will ring the bell at the called station (in a manner to be described later). When the called party answers, his transmitting carrier frequency will be received by the demodulator $SD_1$ and the relay $RL_1$ will be operated, but this will not affect the other circuit connections. The circuit is then in readiness for the two subscribers to proceed with their conversation. When the calling subscriber hangs up, his equipment returns to the condition for receiving an incoming call.

The operation of the arrangement of Fig. 8 in receiving an incoming call will now be described. The demodulator $SD_1$, if composed of a passive element or elements, will be continuously in operative condition. If a demodulator of the vacuum tube type is employed the tubes should be supplied with power continuously or at least during the period when it is desired to receive calls.

When the subscriber's receiver is on the switchhook the relay $RL_3$ is deenergized. The demodulator $SD_1$ is connected through a back contact of this relay to the fixed selecting circuit $FF_2$ so that the incoming call may be received. The modulator MO is connected through a back contact of $RL_3$ to the fixed selecting circuit $FF_1$, while the oscillator is properly adjusted to the subscriber's outgoing frequency assignment by the fixed condenser $FC_1$.

The rectified current produced by the incoming carrier frequency operates the relay $RL_1$, closing the circuit of the bell SB which is connected through one of the contacts of the switchhook. When the subscriber answers the call, the bell circuit is broken by the switchhook. At the same time the power supply is connected to the oscillator and modulator through a contact of the switchhook and carrier supply is brought from the oscillator to the modulator through a back contact of $RL_4$ (which is deenergized). The transmitter receives battery supply through a back contact of $RL_4$, while the receiver circuit is completed through another back contact of $RL_4$. The apparatus is therefore in condition for conversation with the calling party. At the conclusion of the conversation, the subscriber hangs up and the apparatus is in readiness for the next call.

As has been explained, the subscriber station arrangement of Fig. 8 is designed to provide a direct connection between the subscribers within a given area. It is proposed to interconnect such stations with subscriber stations in other areas by providing in each area a central office, so that a connection may be established between a subscriber and his central office, using a frequency or frequencies assigned for that purpose, and the connection completed over suitable interoffice trunks. The method is illustrated schematically in Fig. 9. The central office apparatus to be used in carrying out this method might be patterned after that shown in Figs. 6 and 7. The types of trunks which may be used to interconnect the central offices are well known in the art.

In the subscriber station arrangements described, it may be found desirable to derive all carrier frequencies from a central source, in order to secure greater economy or greater frequency stability than is possible with a number of individual sources. It will be understood that this centralized method of supply is contemplated within the scope of the invention. This method makes it possible to omit from the subscriber equipment the local oscillator and the mechanism for controlling its frequency.

In the arrangements which have been described for selecting channels at subscriber stations and central offices, the entire selection has been accomplished at the channel frequency. It will be evident that this method of selection might be replaced by the well-known superheterodyne method, with partial selectivity provided at the channel frequency and the remaining selectivity furnished by a sharp, intermediate frequency selecting circuit or filter.

It will be evident to those skilled in the art that arrangements for automatically controlling the volume of the signals delivered by the subscriber's equipment may be incorporated in any of the subscribers' station arrangements which have been described, so that conversation between different subscribers may take place over a substantially constant transmission equivalent.

It will be noted that in all of the subscriber station arrangements described above, the apparatus is designed to prevent a subscriber from listening in on the conversations of other subscribers. This, of course, is a very desirable feature for a telephone exchange system.

In all of the arrangements thus far described it has been assumed that a network comprised of coaxial conductors is employed as the common transmitting medium. Circuits of this type will now be more fully described as well as other arrangements for providing a medium capable of transmitting a wide band of frequencies.

Probably the simplest form of common medium would be a network extending to all subscribers within a given area and to the central office for that area. Such a network would be one comprised of ordinary two-conductor circuits suitably interconnected and branched so that the common circuit will be available at all desired points. The circuits comprising the network might, for example, consist of pairs of open-wire or cable conductors. A network of this kind is shown schematically in Fig. 10, where each line represents a pair of conductors, C designates the central office and S a subscriber's station.

It is contemplated also in accordance with the invention that the wire network employed for distributing light and power currents might be used as the common medium from which to derive high-frequency channels for the telephone exchange system. The high-frequency channels would be superposed upon the power network by carrier methods which are well known in the art.

Another form of transmission medium, and one which is peculiarly advantageous in that it is capable of transmitting a wide band of frequencies with comparatively low attenuation and which may be so shielded as to be practically immune to external disturbances, may be found in a circuit consisting of two conductors disposed coaxially with respect to one another. Such a circuit has been disclosed in the patents to L. Espenschied and H. A. Affel, No. 1,835,031, December 8, 1931, H. A. Affel and E. I. Green, No. 1,781,092, November 11, 1930, etc. In this form of circuit, low attenuation at high frequencies may be obtained by the employment of conductors whose high-frequency resistance is suitably small and by the employment of a substantially gaseous dielectric. The outer conductor provides shielding against external disturbances, which shielding becomes more nearly perfect as the frequency is increased, so that at high frequencies the noise due to thermal agitation in the conductors becomes the factor which determines the minimum transmission level. A diagram of one form of coaxial circuit is given in Fig. 11, where 1 designates an outer cylindrical conductor and 2 a conducting wire or tube concentric therewith. The two conductors are maintained in proper spaced relationship by the insulating disks 3. The circuit is shown connected to apparatus 5.

As an alternative to the coaxial circuit, the high-frequency transmission medium might comprise a network of circuits, each consisting of two parallel conductors surrounded by a shield. Circuits of this type are disclosed in the applications of Green, Curtis and Mead, Serial No. 674,762, Patent No. 2,034,032, Green and Curtis, Serial No. 674,763, Patent No. 2,034,033 and Green and Leibe, Serial No. 674,764, Patent No. 2,034,034, all filed June 7, 1933 and all issued March 17, 1936. One form of such a shielded pair is illustrated in Fig. 12, where 1 designates a conducting shield and 2 and 4 represent conductors located on opposite sides of and equidistant from the axis of the shield. These conductors are held in proper spaced relation to one another and the shield by means of insulating disks 3. The conductors 2 and 4 may be connected to apparatus 5. In a circuit of this type it is desirable to employ conductors of suitable size, with as far as possible gaseous insulation, in order to minimize the high-frequency resistance and capacitance and thereby reduce the high-frequency attenuation. The thickness of shield, moreover, should be such as to minimize external disturbances.

The invention contemplates also utilizing as the high-frequency transmission medium a dielectric wave guide comprising a cylindriform dielectric material which may or may not be surrounded by a conductor. Such dielectric guides are disclosed in the patent applications of G. C. Southworth, Serial No. 661,154, filed March 16, 1933, and Serial No. 701,711, filed December 9, 1933. An advantageous form of such a wave guide is a hollow cylindrical conductor containing air or some other gas as the dielectric. This type of circuit is particularly adapted to transmit waves of very high frequencies, for example, of the order of a few centimeters or less in wavelength. Fig. 13 shows one form of such a wave guide. Apparatus 5 produces high-frequency signaling currents which are propagated along the coaxial circuit comprising the tube 1 and the conductor 2, separated from one another by insulating disks 3, as shown in the cut-away portion of the tube. If the frequency is sufficiently high, the conductor 2 need continue only a short distance inside the tube 1, and the electromagnetic waves from the apparatus 4 travel along conductors 1 and 2 and will continue along the tube 1 where the inner conductor has been removed, transmission taking place on the inner surface of the tube and the enclosed dielectric. A similar device may be used at the other end of the dielectric wave guide to receive the signals.

It is contemplated in accordance with the invention that any of the subscriber's set and central office arrangements which have been described may be employed with any of the above types of transmission paths and, in general, the connections between subscribers may be effected either directly or via the central office. When using a network such as that of Fig. 10 for a system in which connections are established through the central office, there might be some advantage in so allocating the frequencies that the outermost subscribers utilize the lower frequencies for which the attenuations are smaller, while the close-in subscribers utilize higher frequencies which undergo higher attenuations.

A conducting network, in addition to being capable of use with various arrangements which are adapted also to radio use, makes it possible to employ certain schemes which are not feasible in the case of radio. Thus the existence of a definite transmission network permits the use of balancing methods to separate opposite directions of transmission and permits, for example, in a system in which transmission takes place directly between subscribers, amplification of the transmission between subscribers at a central point without shifting frequencies. An arrangement of this sort is shown in Fig. 14.

Referring to Fig. 14, a number of subscriber equipments S are each connected to a coaxial line circuit CL through a resistance RC which is preferably large in comparison with the high-frequency characteristic impedance of the line circuit. This line circuit is terminated at each end by means of a resistance RT which is substantially equal to the high-frequency characteristic impedance. It is well known that the characteristic impedance of a circuit at high frequencies is substantially independent of frequency and approaches a pure resistance of value $$\sqrt{L/C}$$

where L is the linear inductance and C the linear capacitance of the circuit. Reflection effects which would result in standing waves on the circuit are avoided by the terminations and the high impedance connections to the subscribers' sets. At an intermediate point in the circuit there is inserted the hybrid coil HB, to the conjugate terminals of which are connected the input and output of the amplifier CR which is designed to amplify a broad band of frequencies. Thus the signals transmitted by any one subscriber are amplified at the central point and passed on to the other subscriber.

Fig. 15 shows a modification of Fig. 14 wherein coaxial lines extend in several directions from the central point. Each line is terminated in a resistance RT which approximates its characteristic impedance. At the central point each of the inner conductors of the various branches is brought through a resistance JR to a common junction point. The function of the resistance JR is to avoid high-frequency reflections which otherwise would be produced at the junction. The method of proportioning these resistances will be hereinafter explained. The hybrid coil HB is shown connected to the common junction through a resistance JR, though it would be possible to omit this resistance if a suitable value were assigned to the others. The opposite side of the hybrid is terminated in a resistance BR which is equal to JR plus the parallel impedance of all the branches. The various transmissions arriving at the central point are amplified by the amplifier AM and retransmitted.

In addition, the carrier frequencies required by the subscriber are supplied from the source CS at the central point. Thus Fig. 15 might be used in conjunction with the subscriber station arrangement of Fig. 4. The arrangement of Fig. 15, including the provision of a common carrier frequency supply, may be used also with the other subscriber station arrangements. The central office apparatus for communication with subscribers is shown at CA in Fig. 15. In case amplification at the central station is not required, the carrier source CS and the apparatus CA may be connected directly to the line junction.

There will now be considered some of the schemes which may be followed in disposing the network which forms the common transmission medium so that it will be available to the subscribers in a given area as well as to the central station. If the subscribers are located in an urban district, the development of the buildings and streets will very likely be in the form of more or less rectangular blocks. Preferably the network should conform to this plan.

Perhaps the simplest scheme for this purpose is to arrange the network in the form of a grid as illustrated schematically in Fig. 16. In this figure each line represents a conducting circuit or guide (for example, a coaxial circuit), the various circuits being connected together at points indicated by the dots. The equipment of each subscriber may be connected to the nearest point of the grid through a high impedance, as shown, for example, in Fig. 14. The central station apparatus CS is connected to the grid somewhere near its center.

One possible difficulty in the arrangement of Fig. 16 may arise from the large number of points of junction or branching which it contains. Each of these points represents a source of transmission loss due to the division of energy between the branches, and also, unless the junction points are specially treated, a source of high-frequency reflections which may be produced by the improper termination which the junction may offer to each circuit entering it.

A further difficulty may arise due to the fact that between any two points of the grid there are several paths over which transmisison may take place, so that the relative phases of the signals arriving over the different paths may result in very inefficient transmission for particular frequencies between particular points.

Another type of network arrangement is shown in Fig. 17. Here a single transmission circiut is provided which extends outwardly from the central station in what may be termed a "square spiral," the circuit being terminated at its outer end in a resistance RT which is substantially equal to its high-frequency characteristic impedance. Again, each subscriber may be connected to the nearest point of the network, the length of such connection, however, being on the average somewhat greater than for Fig. 16. It will be evident that the scheme of Fig. 17 eliminates the points of branching which appeared in Fig. 16 and that the total network mileage has been reduced.

Yet another possible arrangement is shown in Fig. 18, this arrangement being similar to the grid of Fig. 16 but having fewer points of branching. The ends of the various circuits may be terminated in resistances RT as in Fig. 16. It would evidently be possible by bringing the various paths back to the central point to obtain a scheme having only a single junction point rather than the multiple junctions as shown.

Another type of network arrangement is shown in Fig. 19, the circuits being arranged in the form of main feeders extending outwardly from the central station and branch feeders extending at various points from the main feeders.

The reflection effects which would appear at a junction of several circuits such as those in Figs. 16, 18 or 19 may be avoided by the method illustrated in Fig. 20. Assume a number of circuits $n$ which are to be connected to a common junction. For convenience in derivation a single wire ground return type of circuit may be assumed. Let each circuit have a characteristic impedance $Z_0$. Reflections at the outer end of each circuit are avoided by termination approximately equal to $Z_0$ as shown. Each circuit is then connected into the junction point through an impedance $Z_1$ whose value is determined as follows. The impedance looking in toward the junction from any one circuit is $$Z_1 + \frac{Z_1 + Z_0}{n-1} \quad (2)$$

Reflection is avoided by making (2) equal to $Z_0$, which upon simplification yields the following relation:

$$Z_1 = Z_0 \frac{n-2}{n} \quad (3)$$

The impedance $Z_1$ will be substantially a resistance at high frequency. For a coaxial circuit $Z_1$ would be connected in series with the inner conductor. For a balanced two-wire circuit $Z_1/2$ would be inserted in series with each conductor.

It will be apparent that by terminating the ends of circuits in the high-frequency characteristic impedance and by treating the junctions in accordance with Fig. 20, the networks of Figs. 16, 18 or 19 may be arranged so that the high-frequency impedance looking in any direction from any point in the network will be substantially constant and equal to the characteristic impedance of the type of circuit which constitutes the network. In general, this result will obtain at frequencies above the voice range. Thus transmission between any two points in the network may be accomplished without reflection effects.

The method of Fig. 20 also makes it possible to connect subscriber stations to a common transmission network without incurring the loss involved in a high impedance connection such as shown in Fig. 14. In the arrangement shown in Fig. 21 the equipment SA of each subscriber is designed to have a high-frequency impedance equal to the high-frequency characteristic impedance of the line circuit, and reflections at circuit junctions are avoided by inserting resistances of value $$Z_0 \frac{n-2}{n}$$

While the entire preceding discussion has been restricted to systems wherein a common transmission medium is employed for the provision of telephone exchange service between subscribers, it will be understood that the invention contemplates the use of the same general methods for other types of communication. In particular, it will be seen that there has been disclosed a medium which is capable of handling a wide band of frequencies from which a substantial number of television channels may be derived.

It will furthermore be obvious that the general principles herein disclosed may be embodied in many other organizations widely different from those illustrated without departing from the spirit of the invention as defined in the following claims.

What is claimed is:

1. In a system for the exchange of intelligence between any of a plurality of stations taken in pairs, a single common transmitting medium interconnecting all of said stations, said medium being arranged in the form of an extended grid and each station being connected to some point of the grid, and means whereby said transmission path may be utilized simultaneously for a plurality of exchanges of intelligence between different pairs of stations.

2. In a system for telephone communication between any of a plurality of stations taken in pairs, a transmission network to which each of said stations is connected, having a plurality of points at which circuits are branched and a plurality of points at which circuits are terminated, means at said points to equalize the high-frequency impedance measured at any point in any circuit of the network looking in either direction, and means whereby said network may be utilized simultaneously for a plurality of communications between different pairs of stations.

3. In a system for the simultaneous exchange of intelligence between any of a plurality of stations taken in pairs, a transmission network to which each of said stations is connected composed of circuits all having substantially the same high-frequency characteristic impedance and having a plurality of points at which circuits are branched and a plurality of points at which circuits are terminated, means at said points to equalize the high-frequency impedance measured at any point in any circuit of the network looking in either direction.

4. In a system for the simultaneous exchange of intelligence between any of a plurality of stations taken in pairs, a transmission network to which each of said stations is connected composed of circuits all having substantially the same high-frequency characteristic impedance and having a plurality of points at which circuits are branched and a plurality of points at which circuits are terminated, means at said points to equalize the high-frequency impedance measured at any point in any circuit of the network looking in either direction, and means whereby said network may be utilized for a plurality of exchanges of intelligence between different pairs of stations.

5. In a system for telephone communication between any of a plurality of stations taken in pairs, a transmission network to which each of said stations is connected composed of circuits all having substantially the same high-frequency characteristic impedance and having a plurality of points at which circuits are branched and a plurality of points at which circuits are terminated, means at said points to equalize the high-frequency impedance measured at any point in any circuit of the network looking in either direction, and means whereby said network may be utilized simultaneously for a plurality of telephone communications between different pairs of stations.

6. In a telephone system for simultaneous communication between any of a plurality of stations taken in pairs, a transmission network composed of circuits all having substantially the same high-frequency characteristic impedance of value $Z_0$, to which each of said stations is connected, said network including a plurality of circuit junctions, an impedance substantially equal to $$Z_0\left(\frac{n-2}{n}\right)$$

connected in series between each junction of $n$ circuits and each circuit entering said junction, and an impedance substantially equal to $Z_0$ connected to the end of each circuit which is not joined to another circuit.

7. In a system for telephone communication between any of a plurality of stations taken in pairs, a transmission network composed of circuits all having substantially the same high-frequency characteristic impedance of value $Z_0$, each of said stations being connected to said network, said network including a plurality of circuit junctions, an impedance substantially equal to $$Z_0\left(\frac{n-2}{n}\right)$$

connected in series between each junction of $n$ circuits and each circuit entering said junction, and an impedance substantially equal to $Z_0$ connected to the end of each circuit which is not joined to another circuit, and means whereby said network may be utilized simultaneously for a plurality of telephone communications between different pairs of stations.

8. In a system for the exchange of intelligence between any of a plurality of stations taken in pairs, a transmission network composed of circuits all having substantially the same high-frequency characteristic impedance of value $Z_0$, each of said stations being connected to said network, said network including a plurality of circuit junctions, an impedance substantially equal to $$Z_0\left(\frac{n-2}{n}\right)$$

connected in series between each junction of $n$ circuits and each circuit entering said junction, and an impedance substantially equal to $Z_0$ connected to the end of each circuit which is not joined to another circuit, and means whereby said network may be utilized simultaneously for a plurality of exchanges of intelligence between different pairs of stations.

9. In a system for the exchange of intelligence between any of a plurality of stations taken in pairs, a transmission network composed of circuits all having substantially the same high-frequency characteristic impedance of value $Z_0$, each of said stations being connected to said network through an impedance which is large in comparison with $Z_0$, said network including a plurality of circuit junctions, an impedance substantially equal to $$Z_0\left(\frac{n-2}{n}\right)$$

connected in series between each junction of $n$ circuits and each circuit entering said junction, and an impedance substantially equal to $Z_0$ connected to the end of each circuit which is not joined to another circuit, and means whereby said network may be utilized simultaneously for a plurality of exchanges of intelligence between different pairs of stations.

10. In a system for the simultaneous exchange of intelligence between any of a plurality of stations taken in pairs, a transmission network interconnecting all of said stations having a plurality of points at which circuits are branched, and means at said points to prevent reflection effects at any frequency above the audible range in transmission between any two stations.

11. In a system for the simultaneous exchange of intelligence between any of a plurality of stations taken in pairs, a transmission network including a plurality of points at which circuits are branched, apparatus at each of said stations connected to said network, and impedance means placed at proper points of said network to prevent reflection effects at any frequency above the audible range for transmission between any two stations.

12. In a system for the simultaneous exchange of intelligence between any of a plurality of stations taken in pairs, a transmission network extending to all of said stations composed of circuits all having substantially the same high-frequency characteristic impedance of value $Z_0$, and including a plurality of circuit junctions, an impedance substantially equal to $$Z_0\left(\frac{n-2}{n}\right)$$

connected in series between each junction of $n$ circuits and each circuit entering such junction, and an impedance substantially equal to $Z_0$ connected to the end of each circuit which is not joined to another circuit, said network having the property that transmission between any two stations may take place substantially without reflection effects at any frequency above the audible frequency range.

13. As a common medium for signalling from any one of a plurality of more than two stations to any one other station, a system of conductors to which said stations are connected and having branching connections one conductor to another, in combination with means to equalize the impedance either way along any path from one station to another station.

14. The method of joining more than two circuits each of which has a characteristic impedance of value $Z_0$ which consists in inserting between each circuit and the common junction an impedance equal to $Z_0(n-2)/n$ where $n$ is the number of circuits joined together.

15. A transmission network composed of circuits all having substantially the same high frequency characteristic impedance of value $Z_0$, said network including a plurality of circuit junctions and a plurality of points at which circuits are terminated in substantially characteristic impedance and an impedance substantially equal to $Z_0(n-2)/n$ connected in series between each junction of $n$ circuits and each circuit entering said junction.

16. A transmission network composed of circuits all having substantially the same high frequency characteristic impedance of value $Z_0$, said network including a plurality of circuit junctions at which circuits are branched and a plurality of points at which circuits are terminated in substantially characteristic impedance and an impedance substantially equal to $Z_0(n-2)/n$ connected in series between each junction of $n$ circuits and each circuit entering said junction, and apparatus connected to said network at each of a plurality of points through an impedance which is large in comparison with $Z_0$.

17. A transmission network composed of circuits all having substantially the same characteristic impedance and having a plurality of points at which circuits are branched and a plurality of points at which circuits are terminated in substantially characteristic impedance, and impedance equalizing means at each branching point so designed with respect to the circuits branched therefrom that the impedance measured at any point in any circuit of the network looking in either direction is substantially equal to the characteristic impedance of each circuit.

18. A transmission network composed of circuits all having substantially the same high frequency characteristic impedance of substantially constant value and having a plurality of points at which circuits are branched and a plurality of points at which circuits are terminated in high frequency characteristic impedance, and impedance equalizing means at each branching point so designed with respect to the circuits branched therefrom that the high frequency impedance measured at any point in any circuit of the network looking in either direction is substantially independent of frequency.

19. A transmission network composed of circuits all having substantially the same high frequency characteristic impedance of value $Z_0$, said network including a plurality of circuit junctions, an impedance substantially equal to $Z_0(n-2)/n$ connected in series between each junction of $n$ circuits and each circuit entering said junction, and an impedance substantially equal to $Z_0$ connected to the end of each circuit which is not joined to another circuit.

ESTILL I. GREEN.